THIN FILM SIGNAL TRANSLATING DEVICE UTILIZING EMITTER COMPRISING: CdS FILM, INSULATING LAYER, AND MEANS FOR APPLYING POTENTIAL THEREACROSS

Filed June 29, 1962

INVENTOR.
WALTER WITT
BY
Albert L. Free
ATTORNEY

INVENTOR.
WALTER WITT
BY
Albert L. Free
ATTORNEY 3,204,161

THIN FILM SIGNAL TRANSLATING DEVICE UTILIZING EMITTER COMPRISING: CdS FILM, INSULATING LAYER, AND MEANS FOR APPLYING POTENTIAL THEREACROSS

Walter Witt, Philadelphia, Pa., assignor to Philco Corporation, Philadelphia, Pa., a corporation of Delaware
Filed June 29, 1962, Ser. No. 206,499
9 Claims. (Cl. 317—235)

This invention relates to electrical devices, and especially signal-amplifying electrical devices, which employ a thin film of insulating material situated between a pair of conductive bodies, and to methods for making such devices.

In copending application Serial No. 94,902, of R. F. Schwarz and J. P. Spratt, filed March 10, 1961 and entitled "Electrical Device and Method," there is described and claimed an amplifying device employing a tunnel-electron emitter of elementary charge carriers into a metal base. In one form, this emitter comprises a thin insulating film, typically about 20 angstroms in thickness, on said metal base and a conductive emitter contact to the insulating film opposite the metal base. By making the metal base positive with respect to the conductive emitter contact, high-energy electrons from the emitter contact are caused to flow across the thin insulating film to the metal base by quantum-mechanical tunnelling. By using as the base a thin layer of metal forming a potential barrier with an underlying semiconductive substrate, the high-energy emitted electrons are caused to pass through the thin base metal and across the barrier in the semiconductor, and are collected by means of a positive potential applied to another metal contact to the semiconductor. Further, by connecting a load circuit to the collector contact, electrical signals applied between the emitter contact and the metal base layer are made to appear in amplified form at the collector contact. For convenience this type of thin film device will be referred to herein as an interface device, since in operation current flows through the interfacial areas of the emitter contact, the thin insulating film, the metal base and the semiconductor.

Another type of solid-state ampliyfing device utilizing a thin insulating film between two conductive bodies is described and claimed in the copending application Serial No. 155,726 of R. F. Schwarz and J. P. Spratt, filed November 29, 1961, and entitled "Electrical Device and Apparatus and Methods For Fabricating Said Device." In the latter device the two conductive bodies are preferably of metal, and both lie on a common substrate, preferably a semiconductor, which provides a barrier to current flow under each metal body. An insulating film, which is thin compared with the thickness of said barrier and preferably of the order of tens of angstroms in thickness, serves to space the two metal bodies from each other along the surface of the substrate, and is designed to prevent conduction between the two metal bodies except by way of the common substrate. In operation, potentials are applied to the two metal bodies so that the barrier in the substrate breaks down at the edge of one of the metal bodies adjacent the insulating film, and permits emission into the substrate of electrons from that metal body. These emitted electrons are collected by another electrically-biased contact to the substrate. This type of device will be referred to herein as the edge device, since current flow and control action is producted at the edges of the metal bodies and of the insulating film.

Since both the interface device and the edge device rely upon providing a reliably insulating film of the order of only tens of angstroms in thickness between a pair of conductive bodies, and since the characteristics and life of both devices vary substantially with variations in the exact dimensions and nature of this film, it is difficult to make either device with electrical characteristics which are reproducible and which will remain substantially the same over long periods of time.

Accordingly it is an object of my invention to provide a new and improved thin-film solid-state, signal-translating device, and a method for making it.

Another object is to provide a new signal-translating device of the class in which a thin insulating film is disposed between a pair of conductive materials.

A further object is to provide a new emitter of elementary charge carriers of the class which employs a thin insulating film and a conductive connection to a part of said film.

It is another object to provide a new solid-state signal-translating device employing conductive bodies between which a thin-film of insulating material is disposed and across which a potential difference is applied in normal operation.

Still another object is to provide an improved form of thin-film signal-translating device of the interface type.

A further object is to provide an improved form of thin-film signal-translating device of the edge type.

It is still another object to provide new thin-film devices of either the interface or edge types which can be made with more readily reproducible and stable electrical characteristics and greater life, and to provide methods for making them.

In accordance with the invention in one of its broader aspects the above objects are achieved by the provision of a new type of emitter of elementary charge particles which comprises a thin film of insulating material of the order of tens of angstroms in thickness, a layer consisting essentially of cadmium sulphide in contact with said insulating film, a first conductive contact to the side of the cadmium sulphide opposite the insulating film, and a second conductive contact to the side of said film opposite the cadmium sulphide. Preferably the insulating film is an oxide grown on an underlying metal, and the cadmium sulphide is preferably applied to the insulating film by particle deposition. By applying a potential difference between the two conductive contacts, particle emission may be produced from one of the conductive contacts, either through the insulating film or into another material disposed in parallel with the insulating film.

When embodied in an edge-type or interface-type thin-film signal-translating device, the invention in one aspect involves the addition to the previously-known forms of such devices of a layer of cadmium sulphide under that conductive contact which normally lies directly on the exterior of the thin insulating film, and which in the case of the edge device also extends onto the substrate adjacent said film. Therefore in both types of devices the cadmium sulphide separates said conductive contact from the remainder of the structure, and both devices comprise sequential layers of metal, insulating film, cadmium sulphide and conductive contact material.

More specifically, in a preferred form of an interface device in accordance with the invention a complete signal-amplifying structure comprises a non-metallic collector region material, a metal base layer on the collector material, a layer of grown oxide of the base metal of the order of tens of angstroms in thickness covering the base metal, a layer of cadmium sulphide confined to said metal base layer, and a conductive contact to the cadmium sulphide layer opposite the base metal layer. Operating potentials may be applied to a connection on the collector region material, to the base metal layer and to the conductive contact as in the forms of the device described in detail in the above-mentioned copending application Serial No. 94,902.

A preferred form of an edge device utilizing the invention comprises a metal layer on a non-metallic substrate, a grown oxide of said metal of the order of tens of angstroms in thickness on said metal layer including a peripheral portion thereof, a cadmium sulphide layer extending over said peripheral portion of said metal layer and onto the adjacent non-metallic substrate, and a conductive contact to the exterior of the cadmium sulphide layer and preferably to that part of said cadmium sulphide layer which overlies said peripheral portion of said metal layer. Preferably the conductive contact serves as the emitter connection and is made negative with respect to the metal layer, which serves as the base connection of the device. However, amplifying action can also be obtained in such a device by using the conductive contact as the base connection and the metal layer as the emitter.

I have found that when a cadmium sulphide layer is employed in such thin-film devices in accordance with the invention, the devices are in general more stable electrically than those made without it, a typical device maintaining its electrical characteristics substantially invariant for long periods of time and despite relatively large cycles in ambient temperature. Further, while in prior-art devices anomalous input current-voltage characteristics occurred in some devices so that inordinatetely-high applied voltages were necessary for operation, the incidence of such anomalous devices is greatly reduced by using my cadmium-sulphide layer structure. In addition, a large number of devices may be made simultaneously by my process and will exhibit substantially identical electrical characteristics, as opposed to the substantial variations in electrical characteristics from device to device which were frequently observed even in simultaneously-made devices of the prior-art construction. Accordingly the practicability of thin-film amplifying devices of the class described is greatly enhanced by my construction and method.

Other objects and features of the invention will be more readily understood from a consideration of the following detailed description taken in connection with the accompanying drawings, in which.

The invention will now be described, by way of example only, with particular reference to a preferred embodiment thereof which is generally similar to the thin-film interface amplifier described and claimed in the above-cited application Serial No. 94,902, but which differs importantly in the addition of a cadmium sulphide layer to the previously known structure. Referring specially to FIGURES 1 through 5B, in which the various drawings are not necessarily to scale and in which corresponding elments are indicated by corresponding numerals, fabrication of this embodiment of the invention may be started with a wafer 10 of N-type germanium having a metallic connection 12 ohmically soldered to the underside thereof to serve as the collector contact of the device. Typically the wafer material has a resisitivity of one ohm-centimeter, a thickness of about 5 mils, and is of the nature commonly employed in transistor devices. To prepare it for subsequent treatment the wafer is preferably etched, washed with deionized water and dried.

Figure 2A:
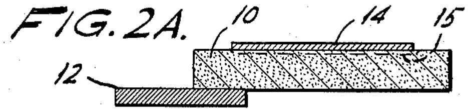
Figure 2B:
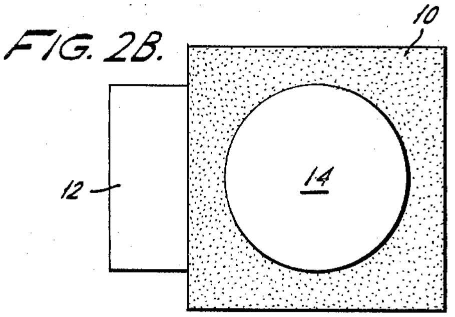
FIGURES 2B and 5B are plan views, of one form of the device of the invention in various stages of fabrication thereof.

As illustrated in FIGURES 2A and 2B, a metal layer 14 of any convenient shape, in this case circular, is deposited upon the upper surface of wafer 10 so as to form a rectifying surface barrier 15 with the germanium. While other metals such as gold may be used for this layer, I prefer to use aluminum for this purpose. This aluminum layer is preferably of the order of 100 to 400 angstroms in thickness so as to be permeable to high-energy electrons, and may be prepared by evaporation in a vacuum chamber at the rate of about 1,000 angstroms of thicknes per second by way of a suitable rapid shutter and masking arrangement. A suitable vacuum for this evaporation process is of the order of $10^{-5}$ to $10^{-6}$ millimeters of mercury, and typical diameter for the aluminum layer 14 is 60 mils.

Figure 3:
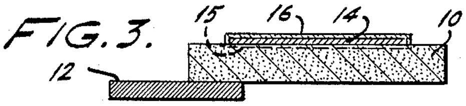

After this evaporation step the wafer and aluminum layer are permitted to cool, and air at room temperature (about 25° C.) is then permitted to enter the vacuum chamber for a period of two to twelve hours to produce, over all of the exposed surfaces of aluminum layer 14, a grown aluminum-oxide layer 16 about 20 angstroms in thickness, as shown in FIGURE 3. As is well known and explained in the copending application, Serial No. 94,902, referred to supra, materials such as aluminum oxide, which are normally insulating, will act as a conductor and support a substantial current of electrons therethrough when sufficient potential is applied thereacross and when reduced to about twenty angstroms or less in thickness. This conduction is due to the phenomenon known as quantum-mechanical tunneling.

Figure 4:
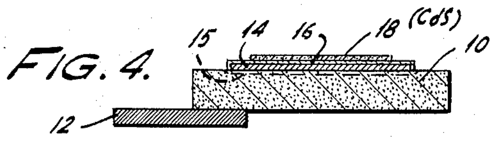

Next, as shown in FIGURE 4, a thin layer 18 of cadmium sulphide is formed on the oxide layer 16. Suitably the cadmium sulphide layer is circular, concentric with aluminum layer 14, and in this example is about 50 mils in diameter so that it is confined entirely to the oxide layer and sufficiently far from the periphery of the oxide layer to avoid electrical surface leakage problems at its edge. Typically the cadmium sulphide layer 18 is about 1 micron in thickness, although thicknesses of from a few tenths to several microns have been found equally successful, and may be provided by evaporation of high-purity cadmium sulphide at about 760° C. for about 1 hour in a vacuum of $10^{-5}$ to $10^{-6}$ millimeters of mercury. Preferably the cadmium sulphide utilized is of very high purity, commonly designated as luminescent-grade cadmium sulphide. In one typical evaporation arrangement the cadmium sulphide is placed in pellet form on the bottom of a molybdenum boat through which electric current is passed to provide the required heating within the vacuum chamber. The structure of FIGURE 3 is placed over the evaporating pellets with the aluminum-coated side downward so that the vaporous cadmium sulphide deposits on the aluminum. Suitable masking is employed to prevent deposition of cadmium sulphide at or beyond the periphery of the aluminum layer.

Figure 5A:
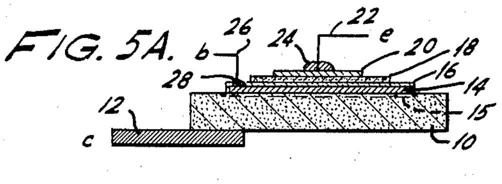
Figure 5B:
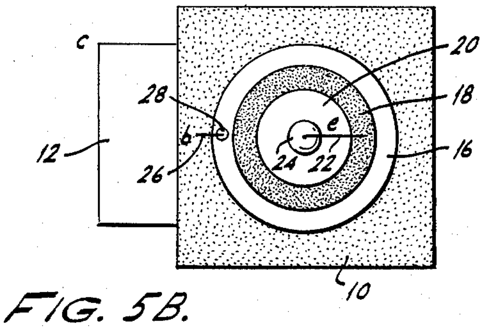

The structure is then cooled again to room temperature and, as illustrated in FIGURES 5A and 5B, a conductive contact 20 which is suitably of indium is applied to the top of the cadmium layer. The indium contact 20 may be circular and concentric with the cadmium sulphide layer, and in the present example may suitably have a diameter of about 40 mils. One convenient mode of application of the indium is by evaporation from a molybdenum boat in the general manner indicated with respect to the evaporation of the cadmium sulphide. Typically this evaporation may be performed for a period of about one minute to form an indium layer about one micron in thickness.

Next a wire lead 22 is electrically connected to the indium layer 20 in any convenient manner, for example by bonding with a globule of silver paste 24. Another lead wire 26 may be similarly connected to the base metal layer 14 by a globule of silver paste 28. In the latter case the silver paste should reach through the oxide layer 16 to the underlying aluminum layer 14, which it will do inherently when applied by most techniques. However, to insure that the technique used is effective to reach the aluminum, one may apply to the oxide layer 16 two such contacts slightly separated from each other and measure the electrical resistance between them to be sure that it is low for both directions of current flow. Either contact may then be used as the base contact of the device. If desired, the complete structure of FIGURES 5A and 5B may be conventionally mounted in a hermetically-sealed transistor container (not shown).

As indicated by letters *e*, *b*, and *c* in FIGURES 5A and 5B, the lead wires 22 and 26 and the metal tab 12 are functionally analogous to the emitter, base and collector leads, respectively, of a transistor. The amplifying characteristics and mode of operation of the device when used as a signal amplifier are generally similar to those described in the above-cited copending application Serial No. 94,902, but the quality, reproducibility, and stability of the electric characteristics produced are generally greatly superior to those produced by the specific structure shown in the latter copending application in which the cadmium sulphide layer is not present.

Figure 6:
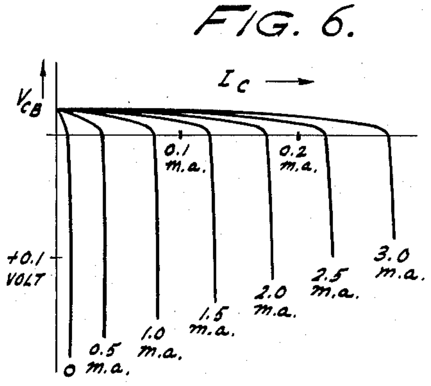
FIGURE 6 is a graphical representation illustrating certain electrical characteristics of one preferred form of device made in accordance with the invention.

Typical common-base collector characteristics for one device which was manufactured in the above-described manner are shown in FIGURE 6. In this figure ordinates represent voltage applied between collector and base leads of the device, while abscissae represent collector current. Each of the seven different characteristics shown is produced for a different fixed value of emitter current indicated at the lower end of each such characteristic. Other significant common-base characteristics of the device are as follows. At 0.5 volt of collector-to-base voltage and with an emitter current of 3 milliamperes, the input impedance $h_{11}$ is about 40 ohms, the feedback parameter $h_{12}$ is substantially zero, the grounded-base alpha $h_{21}$ is about 0.5, and the output admittance $h_{21}$ is about $4 \times 10^{-5}$, while the power gain which the device can produce is greater than 40, or about 16 db.

In my device these electrical characteristics are extremely stable. For example, the device can be temperature cycled to −195° C. and back to room temperature and will then operate with substantially the same characteristics as it exhibited previous to the temperature cycling. Even during the cycling, and at −195° C. for example, the grounded-base current-gain of the device is not substantially different from what it is at room temperature. In addition, a large number of such devices may be made simultaneously in the same vacuum chamber, and when so produced exhibit a high degree of uniformity of electrical characteristics among themselves. Furthermore, while in previously-known devices of the interface type in which cadmium sulphide was not utilized, the input current-voltage characteristics of a substantial proportion of the units were found to vary greatly from the typical desired value, with my construction the number of devices having such anomalous input characteristics is greatly reduced and the yield of devices of desired, predetermined characteristics thereby enhanced.

Figure 7:
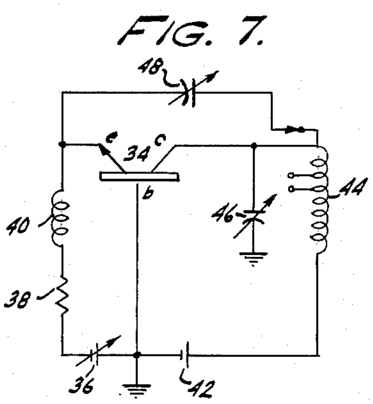
FIGURE 7 is a schematic representation of an electrical circuit utilizing a device made in accordance with the invention.

FIGURE 7 illustrates a typical circuit application for my device in which it is used as a generator of sinusoidal oscillations. In this figure my device is represented schematically at 34 in the manner utilized to indicate transistor devices, the leads marked *e*, *b* and *c* corresponding to the similarly marked leads in FIGURES 5A and 5B. In this case the base lead is grounded and the emitter biased negatively by voltage source 36, which is controllable in value to permit adjustment of the emitter current. In series with the emitter is a current-limiting resistor 38 and a conventional broadband RF coke 40 which is effective at frequencies of the order of a megacycle. The collector element is biased by a voltage source 42 so as to be positive with respect to the base. The collector load circuit comprises a tapped inductor 44 in series between the collector and the voltage source 42, and a variable capacitor 46 connected between the collector and ground. The values of the capacitor 46 and inductor 44 are chosen to provide paralleled resonance in the megacycle region. To provide positive feedback, a variable capacitor 48 is connected between the emitter of device 34 and inductor 44, the connection to inductor 44 being adjustable between the top of the inductor and any of several taps thereon. Typically the voltage provided by voltage source 42 is 3.5 volts, variable capacitor 46 covers a range of about 5 to 150 micro-microfarads as does feedback capacitor 48, and voltage source 36 and current-limiting resistor 38 are selected to permit adjustment of the emitter current from about 0.5 to 5 milliamperes. This circuit arrangement utilizes the gain-providing capabilities of device 34 to generate sinusoidal oscillations, which may be supplied to any suitable load connected across inductor 44. The maximum frequency of oscillation increases with the emitter-current density and, since increases in emitter-current density tend to produce heating of the device 34, for best high-frequency operation conventional arrangements are preferably used to remove as much dissipated heat as possible from device 34.

Figure 8:
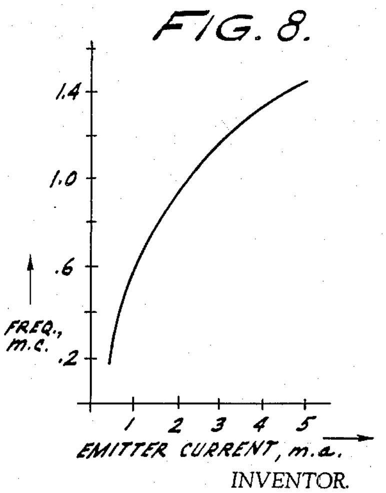
FIGURE 8 is a graphical representation illustrating certain oscillation-generating characteristics of a device constructed in accordance with the invention.

FIGURE 8 illustrates various frequencies of oscillation which can be produced by the circuit in FIGURE 7 for various values of emitter current. In FIGURE 8 ordinates represent oscillation frequencies in megacycles per second, while abscissae represent emitter current in milliamperes. For each value of emitter current the feedback capacitor 48, the tap on inductor 44, and the capacitor 46 are adjusted to provide a maximum oscillation frequency. As shown, oscillation frequencies greater than a megacycle per second are readily obtained and with suitable heat sinking, with elimination of known parasitic oscillations occurring in the circuit, and with the use of smaller active elements in my device 34, the maximum oscillation frequency can be increased considerably further.

Figure 1:
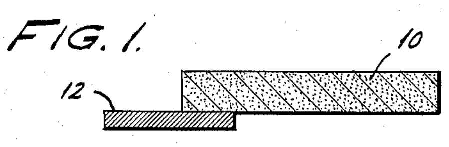
FIGURES 1, 2A, 3, 4 and 5A are sectional views.
Figure 9A:
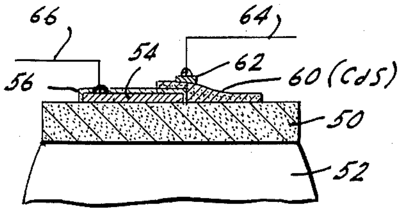
FIGURES 9A and 9B are sectional and plan views respectively of another preferred embodiment of the invention.
Figure 9B:
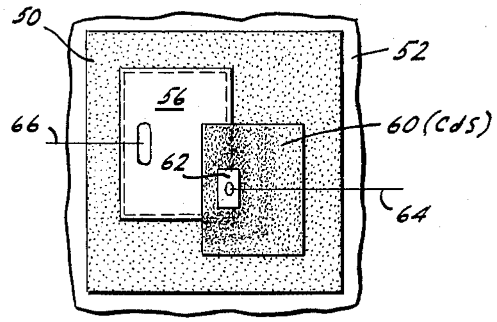

FIGURES 9A and 9B illustrate an application of my invention to the so-called edge device referred to hereinbefore. In this device an N-type germanium wafer 50 similar to that described with respect to FIGURE 1 is mounted, as by soldering with gold-antimony solder, on a suitable metallic header 52, and an aluminum layer 54 is evaporated onto the upper surface of wafer 50. By exposing the evaporated aluminum layer to air for a few hours the insulating aluminum oxide layer 56 is formed over aluminum layer 54 including the edges thereof in contact with the germanium 50. Next the layer of cadmium sulphide 60 is evaporated in a position so that it overlies the part of oxide layer 56 which covers the periphery of the aluminum layer 54. Thus the cadmium sulphide layer 60 overlaps the aluminum layer 54 and extends also onto the immediately adjacent surface of the germanium wafer 50. An indium stripe 62 is evaporated upon the outer surface of the cadmium sulphide opposite the edge of the underlying aluminum, and suitable leads 64 and 66 are electrically connected, as by silver paste, to the indium contact 62 and to the aluminum layer 54 respectively.

In one specific example of an edge device made in accordance with my invention, the aluminum layer 54 is about 300 angstroms thick and about 10 x 15 mils in lateral dimensions. The oxide layer is about 20 angstroms in thickness, and the cadmium sulphide layer is in the form of a rectangle about 4 x 10 mils in lateral dimensions and about 1 micron in thickness. The cadmium sulphide layer overlaps the aluminum over an area which is about 7 x 4 mils in lateral dimensions. The indium contact 62 is also in the form of a rectangular stripe, and may be about 4 x 6 mils in lateral dimensions. In this case the lead 64 to the indium contact may be used as the emitter lead, the lead 66 as the base lead which in operation is made positive with respect to the emitter, and the metal header 52 used as the collector connection, which in operation is made positive with respect to the base lead.

Figure 10:
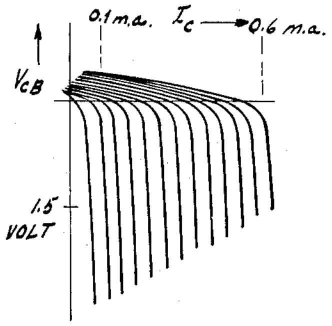
FIGURE 10 is a graphical representation illustrating certain electrical characteristics of the device shown in FIGURES 9A and 9B.

The general mode of operation of this complete edge device is similar to that described in the above-cited co-pending application Serial No. 155,726, and it is therefore unnecessary to set forth the details of its operation and theory herein except to point out that in the present case the contact 62 is preferably biased negatively to the metal layer 54 so that emission of electrons into the germanium occurs from the edge of the cadmium sulphide adjacent the oxide film on the surface of the germanium, rather than from a metal edge. With the form of device shown in FIGURES 9A and 9B using the cadmium sulphide layer 60 to separate the external contact 62 from the body of germanium 50 and from the oxide layer 56, and using the above-mentioned preferred biasing of the device, common-base alpha's of about 0.85 and power gains of about 7 have been obtained. The common-base collector characteristics for this condition of bias are shown in FIGURE 10. In the latter figure ordinates represent collector-to-base voltage while abscissae represent collector current, the several separate characteristics being produced for different values of emitter current. The left-hand curve is obtained with zero emitter current, and each successive characteristic to the right thereof is produced for a progressive increment of 0.05 milliamperes of emitter current. These curves are generally similar to the collector characteristics of transistors.

Figure 11:
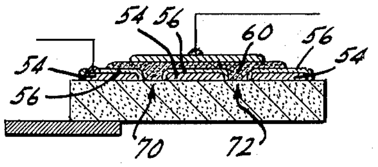
FIGURES 11 and 12 illustrate other forms of devices made in accordance with the invention.

FIGURE 11 shows a variation of the device of FIGURES 9A and 9B in which corresponding parts are designated by corresponding numerals. In this embodiment the aluminum layer 54 is provided with perforations such as 70, 72 and the oxide layer 56 extends over the aluminum layer, over the edges of the aluminum layer adjacent the perforations, and onto the germanium substrate. The cadmium sulphide layer 60 then is applied as in the device of FIGURES 9A and 9B and also extends through the perforations and into contact with the underlying germanium 50. The resultant structure is an edge device, the edges being formed not by the external periphery of the aluminum contact but by the edges of the apertures in the aluminum. The aluminum layer may be provided by evaporation to an average thickness of a few hundred angstroms. The method of manufacture and the operation of the device may be generally similar to those described in the above-mentioned application Serial No. 155,726 except for the application of the cadmium sulphide layer which may be performed in the general manner described hereinbefore.

Figure 12:
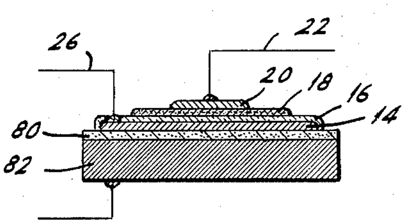

A further variation of the invention is shown in FIGURE 12, in which elements corresponding to those of FIGURES 5A and 5B are indicated by corresponding numerals. The principal difference between the device of FIGURE 12 and that of FIGURES 5A and 5B is that the germanium and the surface barrier produced therein by the aluminum in the device of FIGURES 5A and 5B are replaced by an insulating oxide layer 80 deposited on a metal plate 82, as by evaporation. The device of FIGURE 12 utilizes this insulating layer 80 of silicon monoxide as the collector barrier, in place of the surface barrier in germanium which is utilized in the device of FIGURES 5A and 5B. This device operates generally similarly to that of FIGURES 5A and 5B, although the silicon oxide represents a higher collector barrier and requires higher energies of emitted electrons for usable efficiency of operation. However, when utilizing the cadmium sulphide layer 18 of the invention in the emitter structure of the device, such higher-energy electrons are more readily and more reproducibly obtainable than without the cadmium sulphide layer.

The reasons for the effectiveness of the cadmium sulphide layer in improving the characteristics of such thin-film devices are not fully understood. However, it appears that a potential barrier is formed between the cadmium sulphide and the oxide film, as well as between the cadmium sulphide and the semiconductor in those devices utilizing germanium as the substrate, and that this potential barrier contributes to the improved operation obtained.

While the invention has been described with particular reference to specific embodiments thereof, it will be appreciated that it may be embodied in any of a large variety of forms without departing from the scope of the invention as defined by the appended claims.

I claim:

1. In an emitter of elementary charged particles, the structure which comprises:
   - a film of normally insulating material about twenty angstroms or less in thickness through which a current will flow due to quantum mechanical tunnelling in response to a suitable potential applied thereacross;
   - a layer of cadmium sulphide having a thickness of about one micron over at least a portion of one side of said film; and
   - means for applying a difference in potential between the other side of said film and a portion of said cadmium sulphide layer spaced from said film.

2. The emitter of claim 1, in which said means comprises a first metal contact to said portion of said cadmium sulphide layer and a second metal contact to said other side of said film.

3. The emitter of claim 2 in which said film is an oxide grown on said first metal contact, and said first metal contact is an evaporated layer.

4. The emitter of claim 3, in which said first metal contact is of aluminum.

5. A solid-state signal-translating device which comprises:
   - means forming a potential barrier;
   - a metal layer on said means on one side of said potential barrier;
   - a thin insulating film about twenty angstroms or less in thickness over at least a portion of said metal layer;
   - a layer of cadmium sulphide having a thickness about one micron on at least a portion of said film opposite said metal layer;
   - a conductive contact to the part of said cadmium sulphide layer covering said portion of said film; and
   - conductive connections to said metal layer and to said means on the other side of said potential barrier.

6. The device of claim 5, in which said means comprises a substrate of semiconductive material, said metal layer covers a part only of said substrate, said insulating film extends to the periphery of said metal layer contiguous said substrate, and said cadmium sulphide layer extends over the portion of said film contiguous said substrate and onto said substrate contiguous said film.

7. A solid-state thin-film device comprising:
   - a semiconductive substrate having a metallic contact thereto and having a first metal layer thereon separated from said contact, said metal layer forming a potential surface barrier in said substrate;
   - an insulating film on said first metal layer and having a thickness small compared with the thickness of said barrier, said film extending a peripheral region of said first metal layer contiguous said substrate;
   - a layer of cadmium sulphide on said film and overlying at least a part of said first metal layer and extending across said peripheral region and onto said substrate; and
   - a metallic contact to said cadmium sulphide layer extending over the portion thereof which overlies said peripheral region.

8. The device of claim 7, in which said substrate is a single crystal of germanium, said first metal layer is of aluminum, said insulating film is an oxide grown on said first metal layer and about twenty angstroms or less in thickness, and said cadmium sulphide layer is about one micron in thickness.

9. In a thin-film, solid-state, amplifying device of the class which comprises a substrate which includes a potential barrier, a contact on one side of said substrate, a first metal layer on the other side of said substrate, an insulating film about twenty angstroms or less in thickness on said first metal layer, and a second metal through which connection is made to a portion of said insulating film, the improvement which comprises: a layer of cadmium sulphide having a thickness of about one micron disposed between, and in contact with, said second metal layer and said insulating film.

References Cited by the Examiner

UNITED STATES PATENTS

| | | | |
|---|---|---|---|
| 929,582 | 7/09 | Garretson | 317—237 |
| 1,751,360 | 3/30 | Ruben | 317—234 |
| 2,874,308 | 2/59 | Livingston | 117—215 |
| 2,936,252 | 5/60 | Hanlet | 171—215 X |
| 3,056,073 | 9/62 | Mead | 317—234 |
| 3,116,427 | 12/63 | Giaever | 307—88.5 |

OTHER REFERENCES

Spratt: Physical Review Letters, vol. 6, No. 7, 1961, pages 341–342.

DAVID J. GALVIN, *Primary Examiner.*

JAMES D. KALLAM, *Examiner.*